United States Patent
Nakagawa et al.

(10) Patent No.: US 12,022,181 B2
(45) Date of Patent: Jun. 25, 2024

(54) IMAGING APPARATUS AND METHOD OF DETECTING EXPRESSION

(71) Applicants: SONY GROUP CORPORATION, Tokyo (JP); SONY SEMICONDUCTOR SOLUTIONS CORPORATION, Kanagawa (JP)

(72) Inventors: Kei Nakagawa, Tokyo (JP); Motonari Honda, Kanagawa (JP)

(73) Assignees: SONY GROUP CORPORATION, Tokyo (JP); SONY SEMICONDUCTOR SOLUTIONS CORPORATION, Kanagawa (JP)

(*) Notice: Subject to any disclaimer, the term of this patent is extended or adjusted under 35 U.S.C. 154(b) by 38 days.

(21) Appl. No.: 17/435,502

(22) PCT Filed: Feb. 13, 2020

(86) PCT No.: PCT/JP2020/005563
§ 371 (c)(1),
(2) Date: Sep. 1, 2021

(87) PCT Pub. No.: WO2020/184049
PCT Pub. Date: Sep. 17, 2020

(65) Prior Publication Data
US 2022/0141381 A1 May 5, 2022

(30) Foreign Application Priority Data
Mar. 13, 2019 (JP) .................. 2019-045758

(51) Int. Cl.
*H04N 23/611* (2023.01)
*H04N 23/80* (2023.01)

(52) U.S. Cl.
CPC .......... *H04N 23/611* (2023.01); *H04N 23/80* (2023.01)

(58) Field of Classification Search
CPC ...... H04N 23/611; H04N 23/80; G03B 7/091; G03B 15/00; G03B 19/07; G06T 7/20
See application file for complete search history.

(56) References Cited

U.S. PATENT DOCUMENTS 5,802,220 A * 9/1998 Black ................ G06T 7/215
382/293
9,836,484 B1 12/2017 Bialynicka-Birula
(Continued)

FOREIGN PATENT DOCUMENTS

| CN | 101625505 A | 1/2010 |
|---|---|---|
| CN | 103957357 A | 7/2014 |

(Continued)

OTHER PUBLICATIONS

International Search Report and Written Opinion of PCT Application No. PCT/JP2020/005563, dated Apr. 21, 2020, 09 pages of ISRWO.

*Primary Examiner* — Christopher K Peterson
(74) *Attorney, Agent, or Firm* — CHIP LAW GROUP

(57) ABSTRACT

An imaging apparatus according to an embodiment of the disclosure includes: an event detection device that outputs an event signal corresponding to a temporal change of a first pixel signal, the first pixel signal being obtained by imaging; and an expression detector that detects an expression on a basis of the event signal to be outputted from the event detection device.

11 Claims, 16 Drawing Sheets

(56) References Cited

U.S. PATENT DOCUMENTS

| | | | |
|---|---|---|---|
| 9,838,641 B1 | 12/2017 | Lim | |
| 2008/0317285 A1 | 12/2008 | Abe | |
| 2010/0033590 A1 | 2/2010 | Kawaguchi | |
| 2010/0053363 A1 | 3/2010 | Kim | |
| 2010/0110268 A1 | 5/2010 | Akita | |
| 2010/0188520 A1 | 7/2010 | In | |
| 2015/0365590 A1 | 12/2015 | Ishizuka | |
| 2017/0132466 A1* | 5/2017 | Gousev | G06F 3/013 |
| 2017/0251163 A1* | 8/2017 | Ochiai | G06V 20/59 |
| 2017/0289441 A1 | 10/2017 | Zhang | |

FOREIGN PATENT DOCUMENTS

| | | |
|---|---|---|
| CN | 105103536 A | 11/2015 |
| EP | 2966854 A1 | 1/2016 |
| JP | 2007-236488 A | 9/2007 |
| JP | 2009071471 A | 4/2009 |
| JP | 2016-127525 A | 7/2016 |
| JP | 2018-151660 A | 9/2018 |
| JP | 2018-182496 A | 11/2018 |
| WO | 2014/136521 A1 | 9/2014 |

* cited by examiner

[FIG. 1]
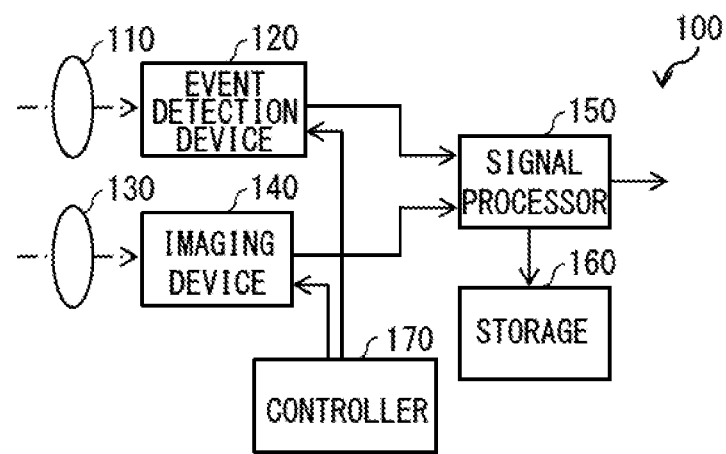
[FIG. 2]
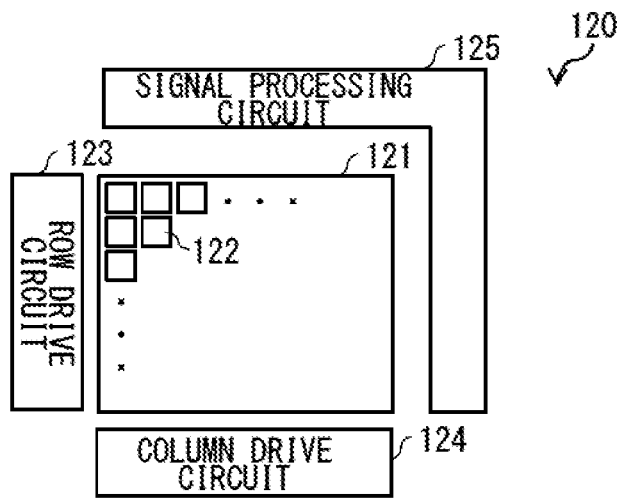

[ FIG. 3 ]
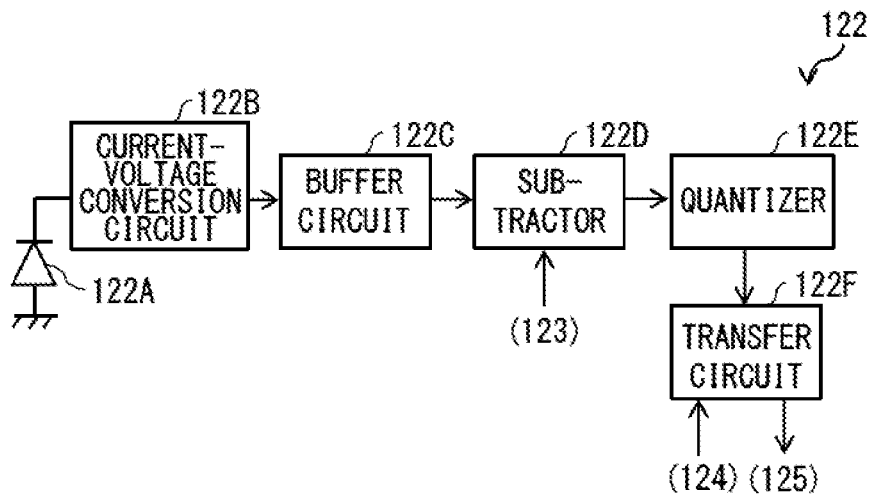
[ FIG. 4 ]
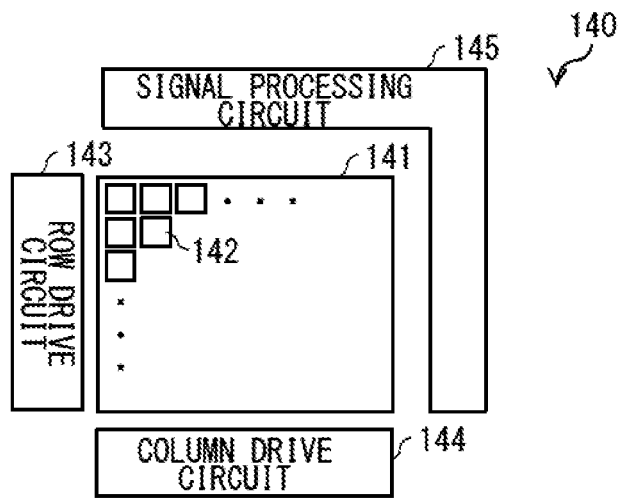

[ FIG. 5 ]
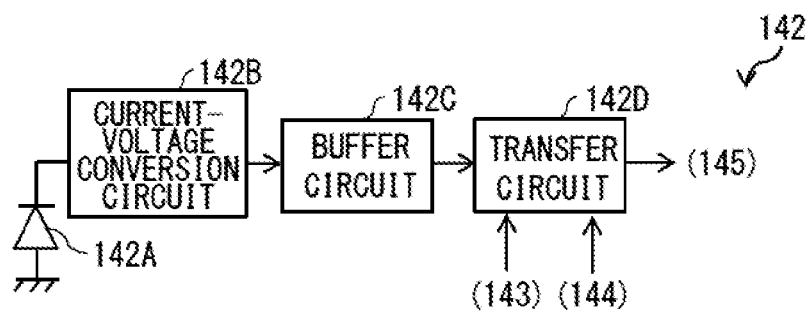
[ FIG. 6 ]
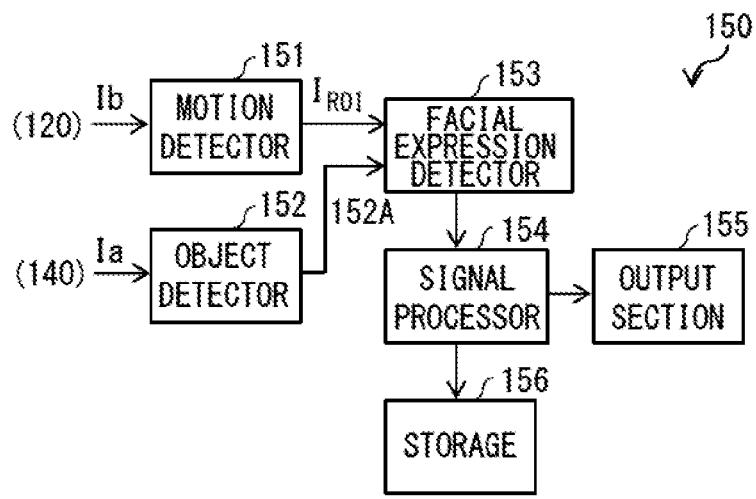

[ FIG. 7 ]
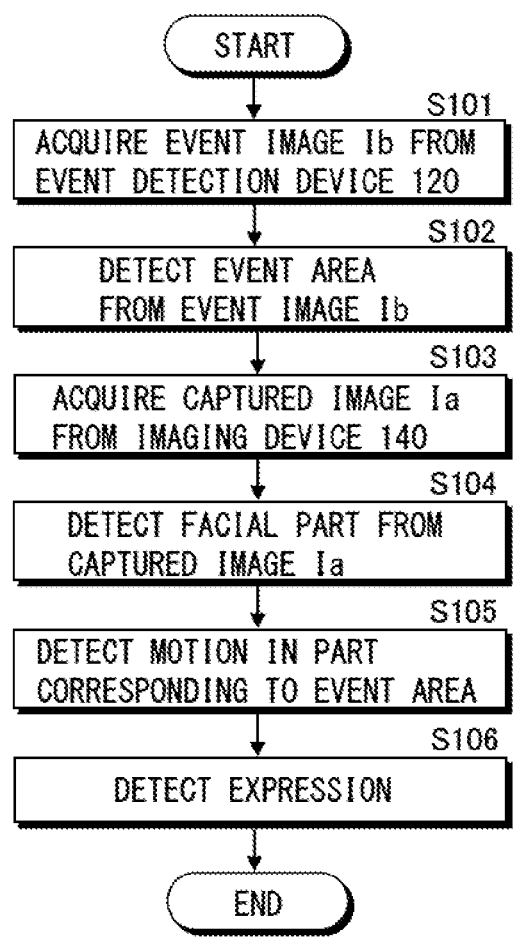

[FIG. 8]
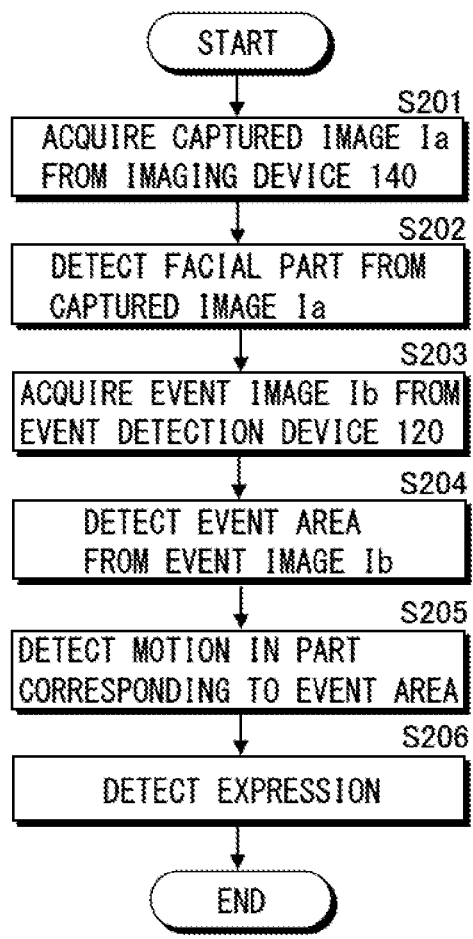

[FIG. 9]
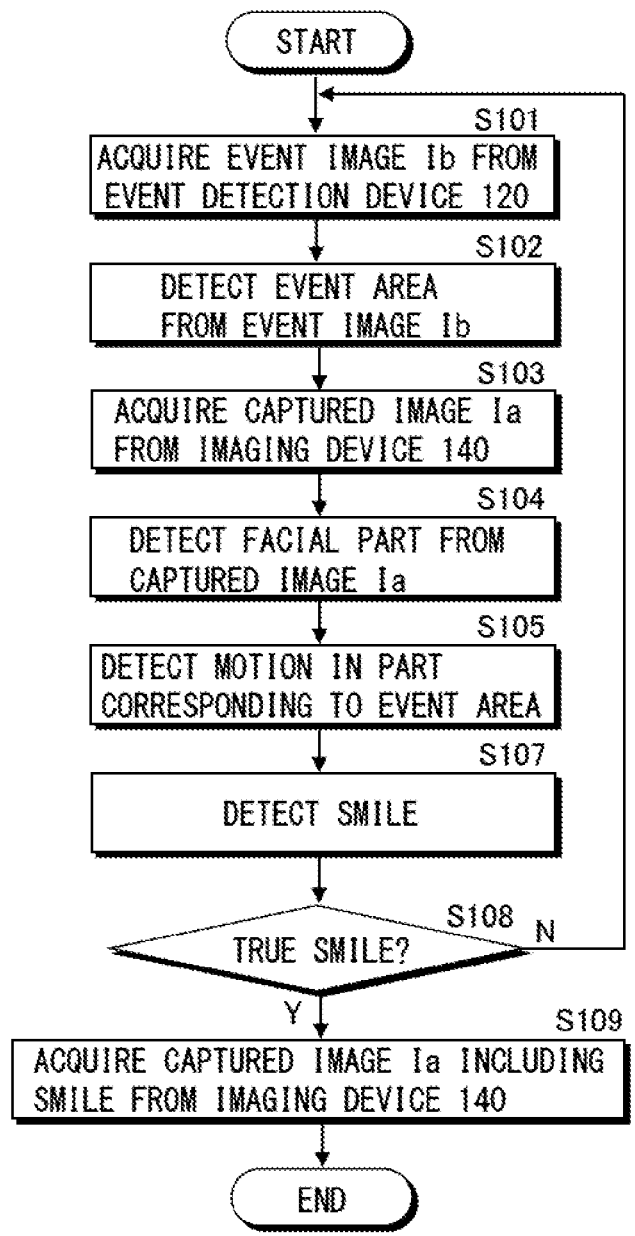

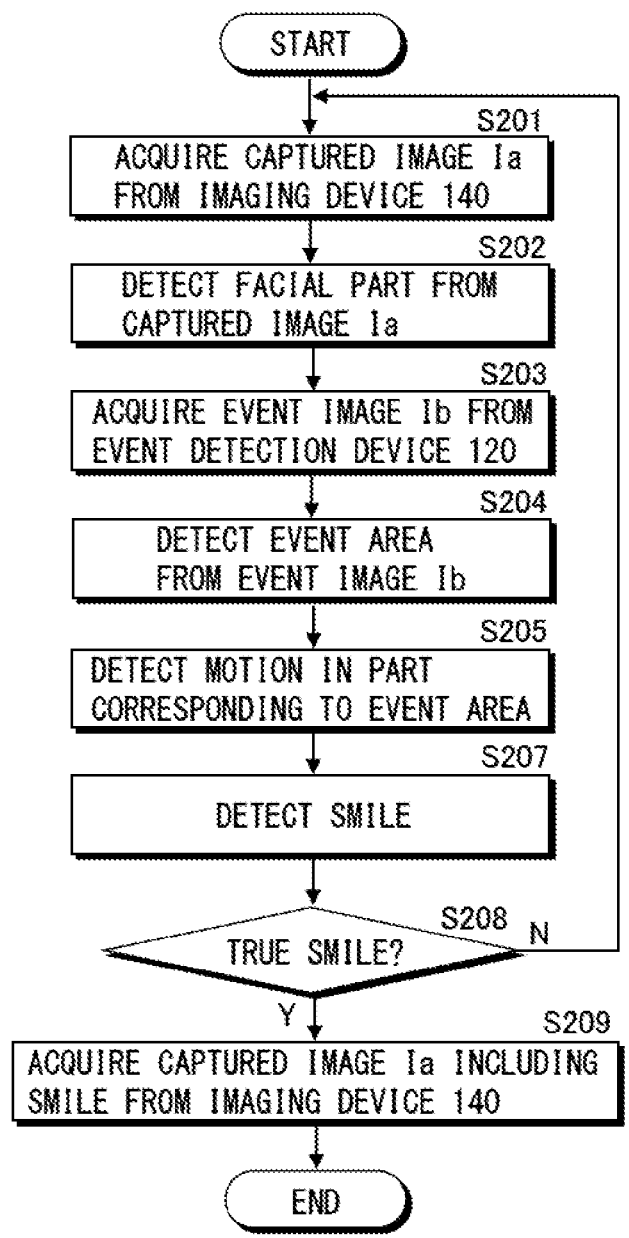
[FIG. 10]

[FIG. 11]
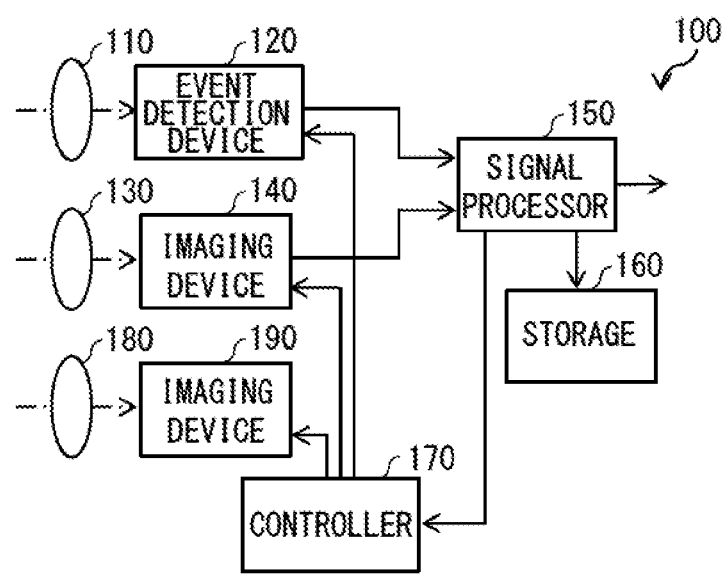

[ FIG. 12 ]
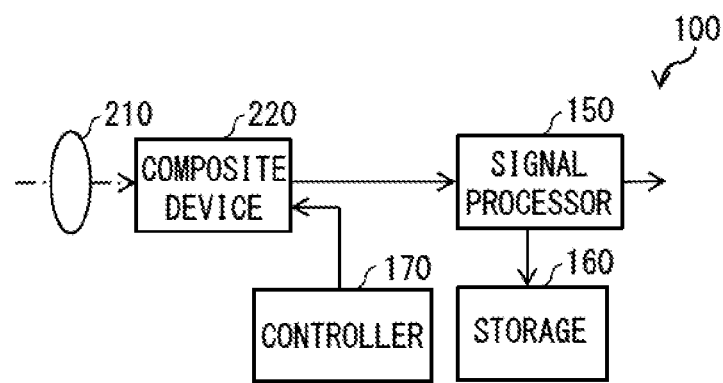
[ FIG. 13 ]
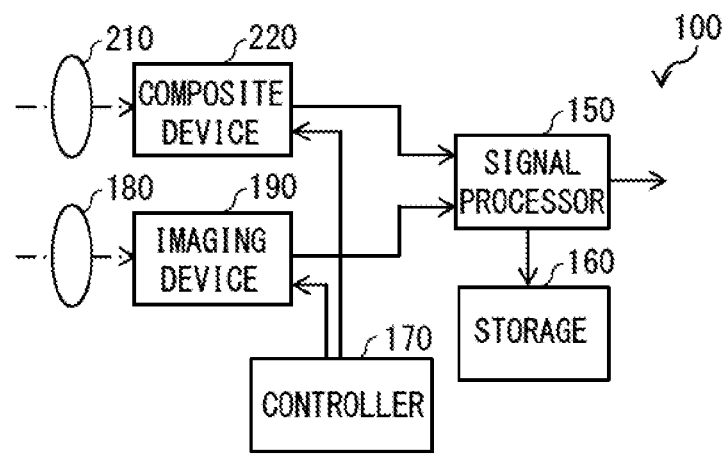

[ FIG. 14 ]
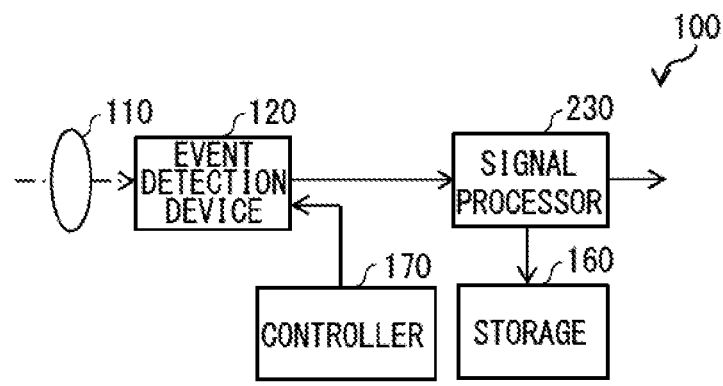
[ FIG. 15 ]
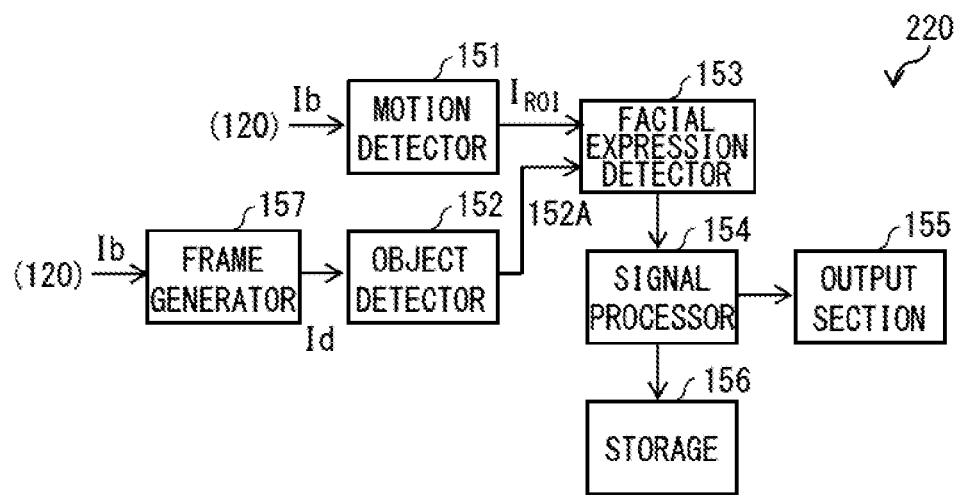

[ FIG. 16 ]
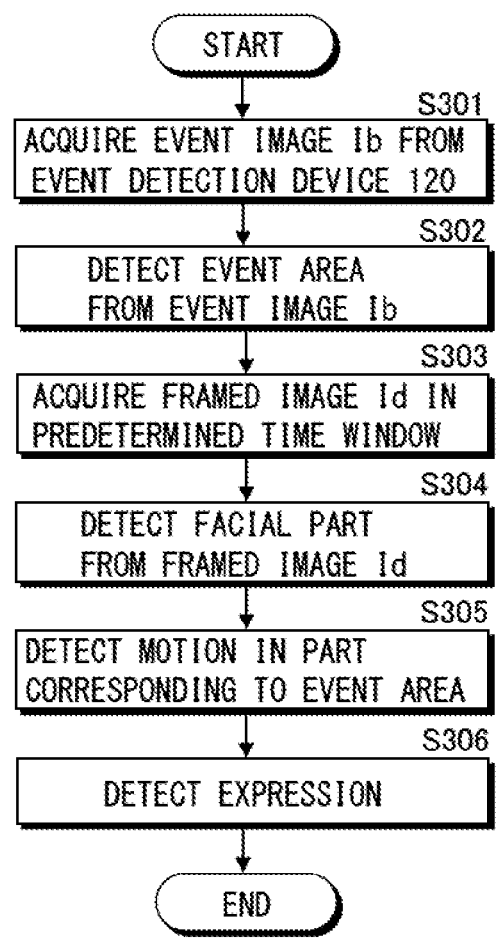

[ FIG. 17 ]
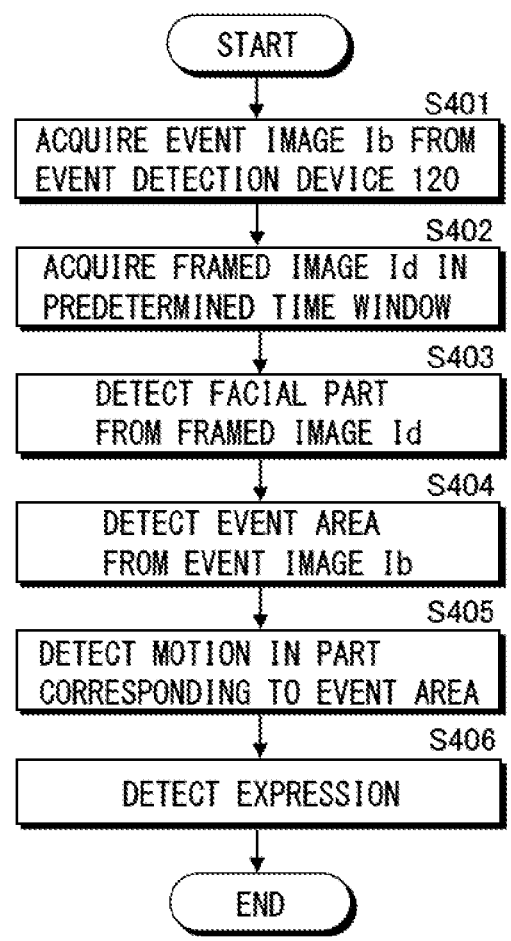

[ FIG. 18 ]
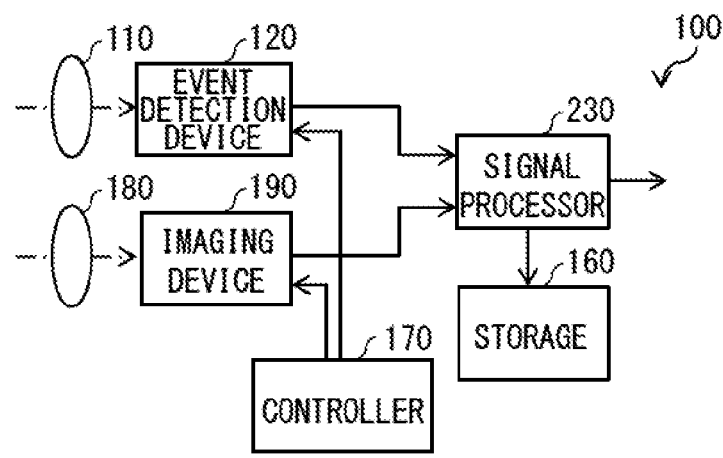

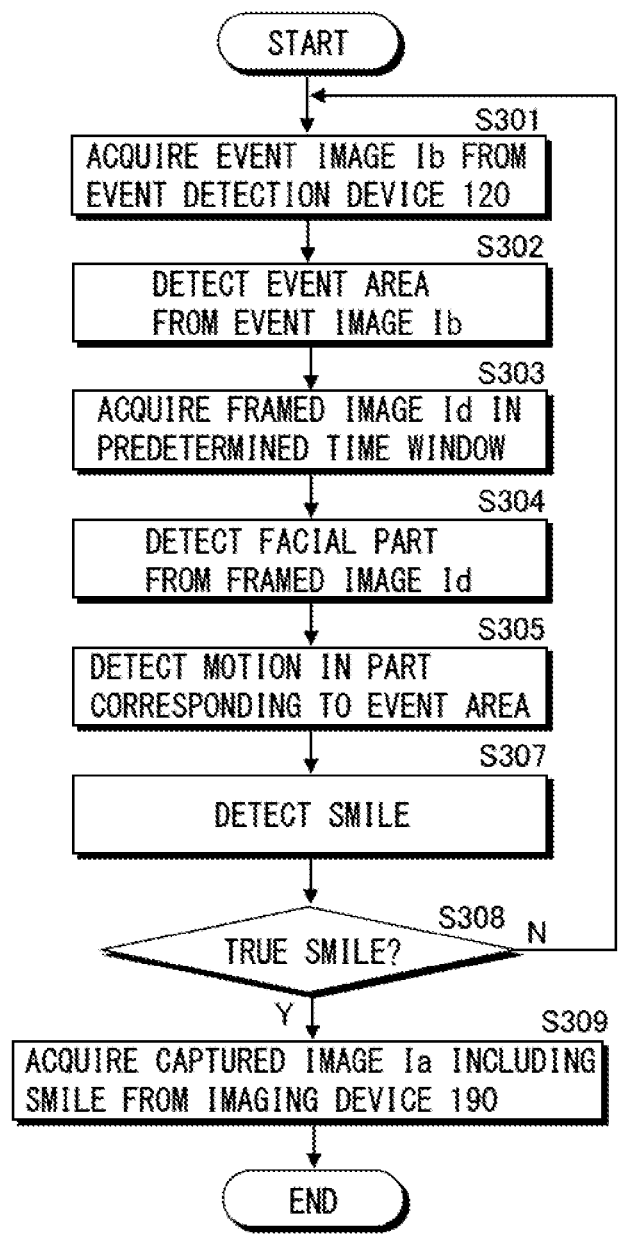
[ FIG. 19 ]

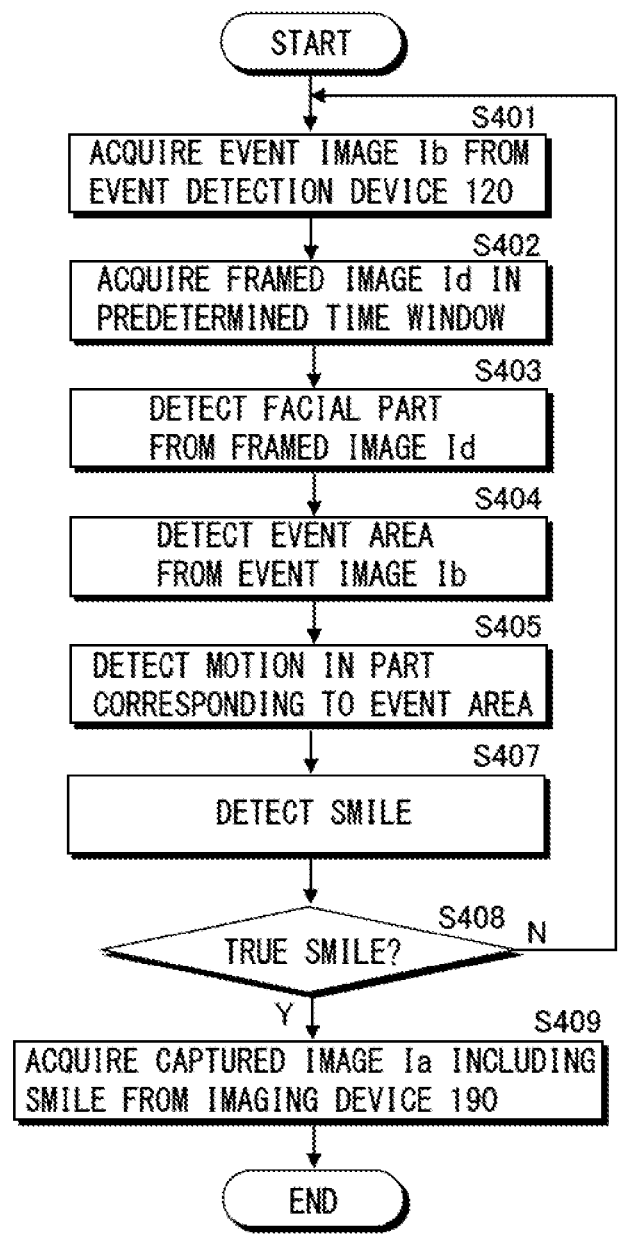

[ FIG. 21 ]
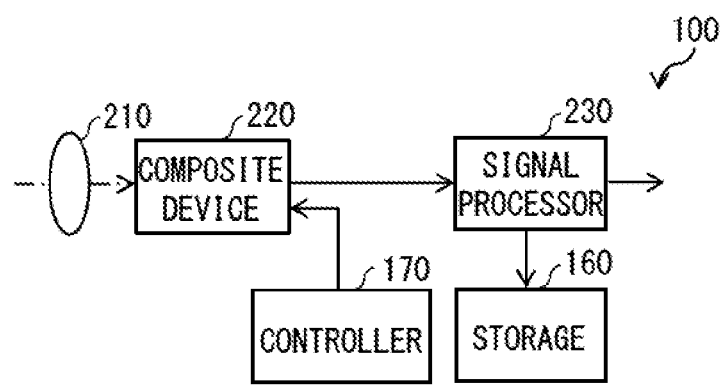

IMAGING APPARATUS AND METHOD OF DETECTING EXPRESSION

CROSS REFERENCE TO RELATED APPLICATIONS

This application is a U.S. National Phase of International Patent Application No. PCT/JP2020/005563 filed on Feb. 13, 2020, which claims priority benefit of Japanese Patent Application No. JP 2019-045758 filed in the Japan Patent Office on Mar. 13, 2019. Each of the above-referenced applications is hereby incorporated herein by reference in its entirety.

TECHNICAL FIELD

The present disclosure relates to an imaging apparatus and a method of detecting an expression.

BACKGROUND ART

A digital camera or a smartphone has recently equipped with a function called "smile shutter" (registered trademark) that automatically releases a shutter in response to a determination result of whether or not a subject has a smile in order to accurately capture a moment of a smile (for example, see PTL 1).

CITATION LIST

Patent Literature

PTL 1: Japanese Unexamined Patent Application Publication No. 2018-151660

SUMMARY OF THE INVENTION

Incidentally, smiles include not only a true smile, but also various smiles such as a fake smile or a forced smile. However, differences therebetween are very slight, and, for example, there is an issue that it is difficult to distinguish the true smile from other types of smiles. Accordingly, it is desirable to provide an imaging apparatus and a method of detecting an expression that are able to identify an expression.

An imaging apparatus according to an embodiment of the disclosure includes: an event detection device that outputs an event signal corresponding to a temporal change of a first pixel signal, the first pixel signal being obtained by imaging; and an expression detector that detects an expression on a basis of the event signal to be outputted from the event detection device.

A method of detecting an expression according to an embodiment of the disclosure includes: generating an event signal corresponding to a temporal change of a first pixel signal, the first pixel signal being obtained by imaging; and detecting an expression on a basis of the event signal that has been generated.

The imaging apparatus and the method of detecting an expression according to an embodiment of the disclosure detects the expression on the basis of the event signal corresponding to the temporal change of the first pixel signal, the first pixel signal being obtained by imaging. This makes it possible to identify a slight difference in the expression.

BRIEF DESCRIPTION OF DRAWINGS

FIG. 1 is a diagram illustrating an example of a schematic configuration of an imaging apparatus according to an embodiment of the disclosure.

FIG. 2 is a diagram illustrating an example of a schematic configuration of an event detection device in FIG. 1.

FIG. 3 is a diagram illustrating an example of a schematic configuration of pixels in FIG. 2.

FIG. 4 is a diagram illustrating an example of a schematic configuration of an imaging device in FIG. 1.

FIG. 5 is a diagram illustrating an example of a schematic configuration of a pixel in FIG. 4.

FIG. 6 is a diagram illustrating an example of a schematic configuration of a signal processor in FIG. 1.

FIG. 7 is a diagram illustrating an example of an expression-detecting procedure performed by the imaging apparatus in FIG. 1.

FIG. 8 is a diagram illustrating a modification example of the expression-detecting procedure performed by the imaging apparatus in FIG. 1.

FIG. 9 is a diagram illustrating a modification example of a procedure of detecting a true smile performed by the imaging apparatus in FIG. 1.

FIG. 10 is a diagram illustrating a modification example of the procedure of detecting the true smile performed by the imaging apparatus in FIG. 1.

FIG. 11 is a diagram illustrating a modification example of the schematic configuration of the imaging apparatus in FIG. 1.

FIG. 12 is a diagram illustrating a modification example of the schematic configuration of the imaging apparatus in FIG. 1.

FIG. 13 is a diagram illustrating a modification example of the schematic configuration of the imaging apparatus in FIG. 1.

FIG. 14 is a diagram illustrating a modification example of the schematic configuration of the imaging apparatus in FIG. 1.

FIG. 15 is a diagram illustrating an example of a schematic configuration of a signal processor FIG. 14.

FIG. 16 is a diagram illustrating an example of an expression-detecting procedure performed by an imaging apparatus in FIG. 14.

FIG. 17 is a modification example of the expression-detecting procedure performed by the imaging apparatus in FIG. 14.

FIG. 18 is a diagram illustrating a modification example of a schematic configuration of the imaging apparatus in FIG. 14.

FIG. 19 is a diagram illustrating a modification example of a procedure of detecting a true smile performed by an imaging apparatus in FIG. 18.

FIG. 20 is a diagram illustrating a modification example of the procedure of detecting the true smile performed by the imaging apparatus in FIG. 18.

FIG. 21 is a diagram illustrating a modification example of a schematic configuration of an imaging apparatus in FIG. 12.

MODES FOR CARRYING OUT THE INVENTION

In the following, some embodiments of the present disclosure are described in detail with reference to the drawings. It is to be noted that description is given in the following order.

1. Embodiment (Imaging Apparatus)
   An example of including an event detection device and an imaging device (FIGS. 1 to 10)
2. Modification Examples (Imaging Apparatuses)
   Modification Example A: an example of including an imaging device separately from an imaging device for detection (FIG. 11)
   Modification Example B: an example of including a device in which the event detection device and the imaging device are combined (FIGS. 12 and 13)
   Modification Example C: an example of performing framing (FIGS. 14 to 17) Modification Example D: an example of performing the framing and including the imaging device separately from the imaging device for detection (FIGS. 18 to 20)
   Modification Example E: an example of including the device in which the event detection device and the imaging device are combined, and performing the framing (FIG. 21)

1. Embodiment

[Configuration]

An imaging apparatus 100 according to an embodiment of the disclosure will be described. FIG. 1 illustrates an example of a schematic configuration of the imaging apparatus 100 according to present embodiment. The imaging apparatus 100 is an apparatus that is able to detect an expression. The imaging apparatus 100 includes, for example, an imaging lens 110, an event detection device 120, an imaging lens 130, an imaging device 140, a signal processor 150, a storage 160, and a controller 170.

The imaging lens 110 condenses entering light and directs the condensed light to the event detection device 120. The event detection device 120 outputs, as an event image Ib, an event signal corresponding to a temporal change of a pixel signal (a first pixel signal) obtained by imaging. The imaging lens 130 condenses entering light and directs the condensed light to the imaging device 140. The imaging device 140 generates a pixel signal (a second pixel signal) by imaging, and outputs the generated pixel signal as a captured image Ia. The signal processor 150 performs a predetermined process on the basis of the event image Ib and the captured image Ia, and stores the processed data in the storage 160 or outputs the processed data outside. The storage 160 records the data from the signal processor 150. The controller 170 controls the event detection device 120 and the imaging device 140 to cause imaging to be executed.

FIG. 2 illustrates a schematic configuration example of the event detection device 120. The event detection device 120 includes, for example, a pixel array 121 in which a plurality of pixels 122 is arranged in a matrix, a row drive circuit 123, a column drive circuit 124, and a signal processing circuit 125. Each of the pixels 122 outputs an event signal corresponding to a temporal change (a difference between before and after in terms of time) of the pixel signal (the first pixel signal) obtained by imaging. The row drive circuit 123 selects a row address and causes the signal processing circuit 125 to output an event signal corresponding to the row address. The column drive circuit 124 selects a column address and causes the signal processing circuit 125 to output an event signal corresponding to the column address. The signal processing circuit 125 performs a predetermined signal process on the event signal outputted from the pixel array 121. The signal processing circuit 125, for example, arranges event signals as pixel signals in a two-dimensional lattice, generates image data (the event image Ib) having 1-bit information for each pixel, and outputs the image data to the signal processor 150.

FIG. 3 illustrates a schematic configuration example of each pixel 122. Each pixel 122 includes, for example, a photodiode 122A, a current-voltage conversion circuit 122B, a buffer circuit 122C, a subtractor 122D, a quantizer 122E, and a transfer circuit 122F.

The photodiode 122A photoelectrically converts entering light to generate a photocurrent. The current-voltage conversion circuit 122B converts the photocurrent from the corresponding photodiode 122A into a voltage signal. The current-voltage conversion circuit 122B is, for example, a logarithmic conversion circuit for converting the photocurrent from the corresponding photodiode 122A into a logarithmic voltage signal. Examples of the logarithmic conversion circuit include, for example, a diode type, a gate ground type, a source ground type, and a gain boost type. The current-voltage conversion circuit 122B outputs the voltage signal to the buffer circuit 122C. The buffer circuit 122C is, for example, a source follower circuit that performs impedance conversion, corrects a signal level of the voltage signal inputted from the current-voltage conversion circuit 122B, and outputs the corrected voltage signal to the subtractor 122D.

The subtractor 122D lowers the level of the voltage signal outputted from the buffer circuit 122C in accordance with a row drive signal outputted from the row drive circuit 123. The subtractor 122D includes, for example, two capacitors, an inverter, and a switch. One capacitor (hereinafter referred to as "capacitor C1") has one end coupled to an output terminal of the buffer circuit 122C and the other end coupled to an input terminal of the inverter. The other capacitor (hereinafter referred to as "capacitor C2") is coupled in parallel to the inverter. The switch is coupled in parallel to the inverter. The switch is opened and closed in accordance with the row drive signal. The inverter inverts the voltage signal inputted from the buffer circuit 122C via the capacitor C1. The inverter outputs the inverted signal to the quantizer 122E.

Upon turning on the switch, a voltage signal $V_{init}$ is inputted to a buffer circuit 122C side of the capacitor C1, and the opposite side is a virtual grounding terminal. A potential of the virtual ground terminal is zero as a matter of convenience. In this case, potential $Q_{init}$ accumulated in the capacitor C1 is expressed by the following equation, where Ca represents a capacity of the capacitor C1. In contrast, both ends of the capacitor C2 are short-circuited, and thus, accumulated electric charge is zero.

$$Q_{init} = Ca \times V_{init} \qquad \text{Equation 1}$$

Next, assuming a case where the switch is turned off and a voltage on the buffer circuit 122C side of the capacitor C1 changes to $V_{after}$, electric charge $Q_{after}$ to be accumulated in the capacitor C1 is represented by the following equation.

$$Q_{after} = Ca \times V_{after} \qquad \text{Equation 2}$$

In contrast, electric charge Q2 accumulated in the capacitor C2 is expressed by the following equation, where Cb represents a capacity of the capacitor C2 and $V_{out}$ represents an output voltage.

$$Q2 = -Cb \times V_{out} \qquad \text{Equation 3}$$

In this case, a total electric charge amount of the capacitors C1 and C2 do not change; therefore, the following equation is satisfied.

$$Q_{init} = Q_{after} + Q2 \qquad \text{Equation 4}$$

If Equations 1 to 3 are substituted into Equation 4 and transformed, the following equation is obtained.

$$V_{out} = -(Ca/Cb) \times (V_{after} - V_{init})$$ Equation 5

Equation 5 represents a subtraction operation of the voltage signal, and a gain of a subtraction result is Ca/Cb. It is usually desired to maximize the gain; therefore, it is preferable to design Ca to be large and Cb to be small. However, if Cb is too small, kTC noise increases and a noise property may deteriorate, so capacity reduction of Cb is limited to an extent that the noise is allowable. In addition, the pixel array 121 including the subtractor 122D is mounted for each pixel 122; therefore, the capacity Ca and the capacity Cb are limited in area. Taking those into consideration, for example, Ca is set to a value of 20 to 200 femtofarads (fF), and Cb is set to a value of 1 to 20 femtofarads (fF).

The quantizer 122E includes, for example, a comparator. The comparator compares, for example, the voltage signal inputted from the subtractor 122D to two thresholds, and assigns, in response to the result, one of values of +1, 0, and −1 to the voltage signal. The quantizer 122E outputs, as a detection signal, a signal indicating the result of the comparison (for example, one of the values of +1, 0, and −1 assigned to the voltage signal) to the transfer circuit 122F. The transfer circuit 122F transfers the detection signal from the quantizer 122E to the signal processing circuit 125 in accordance with a column drive signal outputted from the column drive circuit 124.

FIG. 4 illustrates a schematic configuration example of the imaging device 140. The imaging device 140 includes, for example, a pixel array 141 in which a plurality of pixels 142 is arranged in a matrix, a row drive circuit 143, a column drive circuit 144, and a signal processing circuit 145. Each of the pixels 142 generates a pixel signal (a second pixel signal) by imaging and outputs the pixel signal. The row drive circuit 143 selects a row address and causes the signal processing circuit 145 to output a pixel signal corresponding to the row address. The column drive circuit 144 selects a column address and causes the signal processing circuit 145 to output a pixel signal corresponding to the column address. The signal processing circuit 145 performs a predetermined signal process on the pixel signal outputted from the pixel array 141. The signal processing circuit 145, for example, arranges pixel signals in a two-dimensional lattice, generates image data (the captured image Ia) having 1-bit information for each pixel, and outputs the image data to the signal processor 150.

FIG. 5 illustrates a schematic configuration example of each pixel 142. Each pixel 142 includes, for example, a photodiode 142A, a current-voltage conversion circuit 142B, a buffer circuit 142C, and a transfer circuit 142D.

The photodiode 142A photoelectrically converts entering light to generate a photocurrent. The current-voltage conversion circuit 142B converts the photocurrent from the corresponding photodiode 142A into a voltage signal. The current-voltage conversion circuit 142B outputs the voltage signal to the buffer circuit 142C. The buffer circuit 142C is, for example, a source follower circuit that performs impedance conversion, corrects a signal level of the voltage signal inputted from the current-voltage conversion circuit 142B, and outputs the corrected voltage signal to the transfer circuit 142D. The transfer circuit 142D transfers a detection signal from the buffer circuit 142C to the signal processing circuit 14 in accordance with a row drive signal outputted from the row drive circuit 143 and a column drive signal outputted from the column drive circuit 144.

FIG. 6 illustrates a schematic configuration example of the signal processor 150. The signal processor 150 includes, for example, a motion detector 151, an object detector 152, a facial expression detector 153, a signal processor 154, an output section 155, and a storage 156.

The motion detector 151 detects one or a plurality of event areas corresponding to a moving portion on the basis of the event image Ib (the event signal). The motion detector 151 further cuts out a portion corresponding to the detected one or plurality of event areas, out of the event image Ib. The motion detector 151 outputs image data $I_{ROI}$ of the one or plurality of areas ROI (Region Of Interest) cut out from the event image Ib to the facial expression detector 153.

The object detector 152 detects one or a plurality of parts included in a face on the basis of the captured image Ia (the pixel signal) obtained from the imaging device 140. The parts included in the face include, for example, eyes, a nose, a mouth, and the like. The object detector 152 outputs information of the detected part(s) (part information 152A) to the facial expression detector 153. The part information 152A includes, for example, a name, position coordinates, and the like.

The facial expression detector 153 detects an expression on the basis of the event image Ib (the event signal) outputted from the event detection device 120. Specifically, the facial expression detector 153 detects a motion of one or a plurality of target parts corresponding to the one or plurality of event areas among the one or plurality of parts (the part information 152A) on the basis of the image data $I_{ROI}$ (the event signal), and detects the expression on the basis of a result of the detection.

The signal processor 154 generates a control signal corresponding to the expression detected by the facial expression detector 153, and outputs the control signal to the output section 155. The signal processor 154 also stores in the storage 156 information related to the expression detected by the facial expression detector 153. The output section 155 outputs the control signal inputted from the signal processor 154 to the outside.

[Detection of Expression]

Next, an expression-detecting procedure performed by the imaging apparatus 100 according to the present embodiment will be described. FIG. 7 illustrates an example of the expression-detecting procedure performed by the imaging apparatus 100.

First, the signal processor 150 acquires the event image Ib (the event signal) from the event detection device 120 (step S101). The signal processor 150 then detects one or a plurality of event areas corresponding to a moving portion on the basis of the event image Ib (the event signal) (step S102). The signal processor 150 then cuts out the portion (the region ROI) corresponding to the detected one or plurality of event areas, out of the event image Ib, thereby acquiring one or a plurality of pieces of image data $I_{ROI}$.

Next, the signal processor 150 acquires the captured image Ia (the pixel signal) from the imaging device 140 (step S103). The signal processor 150 then detects one or a plurality of parts included in the face on the basis of the captured image Ia (step S104). The signal processor 150 then detects the expression on the basis of the event image Ib (the event signal) outputted from the event detection device 120. Specifically, the signal processor 150 detects a motion of one or a plurality of target parts corresponding to the one or plurality of event areas among the one or plurality of parts (the part information 152A) on the basis of the image data $I_{ROI}$ (the event signal) (step S105). Subsequently, the signal processor 150 detects the expression on the basis of the result of the detection (step S106). Examples of types of the expression to be detected include a true smile, a forced smile, and a fake smile.

Detection of an expression performed by the imaging apparatus 1 may also have a procedure as illustrated in FIG. 8, for example. Specifically, first, the signal processor 150 acquires the captured image Ia (the pixel signal) from the imaging device 140 (step S201). The signal processor 150 then detects one or a plurality of parts included in the face on the basis of the captured image Ia (step S202).

The signal processor 150 then acquires the event image Ib (the event signal) from the event detection device 120 (step S203). The signal processor 150 then detects one or a plurality of event areas corresponding to a moving portion on the basis of the event image Ib (the event signal) (step S204). The signal processor 150 then cuts out the portion (the region ROI) corresponding to the detected one or plurality of event areas, out of the event image Ib, thereby acquiring one or a plurality of pieces of image data $I_{ROI}$.

Next, the signal processor 150 detects the expression on the basis of the event image Ib (the event signal) outputted from the event detection device 120. Specifically, the signal processor 150 detects a motion of one or a plurality of target parts corresponding to the one or plurality of event areas among the one or plurality of parts (the part information 152A) on the basis of the image data $I_{ROI}$ (the event signal) (step S205). Subsequently, the signal processor 150 detects the expression on the basis of the result of the detection (step S206). Examples of types of the expression to be detected include a true smile, a forced smile, and a fake smile.

[Detection of True Smile]

Next, a procedure of detecting a true smile performed by the imaging apparatus 100 according to the present embodiment will be described. FIG. 9 illustrates an example of the procedure of detecting the true smile performed by the imaging apparatus 100.

First, the signal processor 150 executes the above-described steps S101 to S105. The signal processor 150 then detects a smile on the basis of a result of the detection in step S105 (step S107). Subsequently, the signal processor 150 determines whether or not the detected smile is the true smile (step S108). For example, in a case where the result of the detection in step S105 indicates that a motion of a mouth is earlier than a motion of an eye, the signal processor 150 determines that the detected smile is the true smile and issues an instruction to the imaging device 140 to perform imaging via the controller 170. The signal processor 150 acquires the captured image Ia including the true smile from the imaging device 140 (step S109). In contrast, for example, in a case where the result of the detection in step S105 indicates that the motion of the mouth is as early as or later than the motion of the eye, the signal processor 150 determines that the detected smile is not the true smile, and the procedure makes the transition to step S101. In this manner, the captured image Ia including the true smile is acquired.

Detection of the true smile performed by the imaging apparatus 100 may also have a procedure as illustrated in FIG. 10, for example. Specifically, first, the signal processor 150 executes the above-described steps S201 to S205. The signal processor 150 then detects a smile the basis of a result of the detection in step S205 (step S207). Subsequently, the signal processor 150 determines whether or not the detected smile is the true smile (step S208). For example, in the case where the result of the detection in step S205 indicates that the motion of the mouth is earlier than the motion of the eye, the signal processor 150 determines that the detected smile is the true smile and issues an instruction to the imaging device 140 to perform imaging via the controller 170. The signal processor 150 acquires the captured image Ia including the true smile from the imaging device 140 (step S209). In contrast, for example, in the case where the result of the detection in step S205 indicates that the motion of the mouth is as early as or later than the motion of the eye, the signal processor 150 determines that the detected smile is not the true smile, and the procedure makes the transition to step S201. In this manner, the true smile is detected.

[Effects]

Next, effects of imaging apparatus 100 according to present embodiment will be described.

A digital camera or a smartphone has recently equipped with a function called "smile shutter" (registered trademark) that automatically releases a shutter in response to a determination result of whether or not a subject has a smile in order to accurately capture a moment of a smile. Incidentally, smiles include not only a true smile, but also various smiles such as a fake smile or a forced smile. However, differences therebetween are very slight, and, for example, there is an issue that it is difficult to distinguish the true smile from other types of smiles.

In contrast, the present embodiment detects the expression on the basis of the event image Ib (the event signal) obtained from the event detection device 120. This makes it possible to identify a slight difference in the expression. Thus, it is possible to identify the expression.

Further, in the present embodiment, the motion of the one or plurality of target parts corresponding to the one or plurality of event areas among the one or plurality of parts (the part information 152A) is detected on the basis of the image data $I_{ROI}$ (the event signal), and the expression is detected on the basis of the result of the detection. This makes it possible to identify a slight difference in the expression. Thus, it is possible to identify the expression.

Still further, in the present embodiment, in the case where the result of the detection in step S105 or step S205 indicates that the motion of the mouth is earlier than the motion of the eye, it is determined that the detected smile is the true smile. In this manner, the present embodiment makes it possible to identify the type of the smile on the basis of the slight motion of the mouth, the eye, or the like.

2. Modification Example

Next, modification examples of the imaging apparatus 100 according to the present embodiment will be described. It is to be noted that, in the following description, the same reference numerals as those in the above embodiment are given to the same components as those in the above embodiment.

Modification Example A

In the embodiment described above, the imaging apparatus 100 may further include, for example, an imaging device 190 apart from the imaging device 140 used for identifying the type of the smile, as illustrated in FIG. 11. In this case, the imaging apparatus 100 may further include an imaging lens 180 that condenses entering light and directs the condensed light to the imaging device 190. The imaging device 190 generates a pixel signal by imaging, and outputs the generated pixel signal as a captured image Id. The imaging device 190 has, for example, components that are common to the imaging device 140. In such a case, the signal processor 150 may issue an instruction to the imaging device

190 to perform imaging via the controller 170 in the above-described steps S109 and S209. In this case, the signal processor 150 acquires the captured image Ia including the true smile from the imaging device 190.

Modification Example B

In the embodiment and the modification example A described above, for example, as illustrated in FIGS. 12 and 13, the imaging device 140 may be omitted, and a composite device 220 may be provided instead of the event detection device 120. The composite device 220 is configured such that the event detection device 120 includes the imaging device 140. In such a case, the signal processor 150 may acquire the event image Ib (the event signal) from the composite device 220 in the above-described steps S101 and S203 described above. Further, in the above-described steps S103 and S201, the signal processor 150 may acquire the captured image Ia (the pixel signal) from the composite device 220. Further, in the above-described steps S109 and S209, the signal processor 150 may acquire the captured image Ia (the pixel signal) including the true smile from the composite device 220.

Modification Example C

In the above embodiment, for example, as illustrated in FIG. 14, the imaging device 140 may be omitted, and a signal processor 230 may be provided instead of the signal processor 150. In this case, for example, as illustrated in FIG. 15, the signal processor 230 includes a frame generator 157 in addition to the components included in the signal processor 150.

The frame generator 157 generates a framed image Id using the event image Ib (the event signal) outputted from the event detection device 120 in a predetermined time window. In the present modification example, the object detector 152 detects one or a plurality of parts included in the face on the basis of the framed image Id generated by the frame generator 157.

[Detection of Expression]

Next, an expression-detecting procedure performed by the imaging apparatus 100 according to the present modification example will be described. FIG. 16 illustrates an example of the expression-detecting procedure performed by the imaging apparatus 100 according to the present modification example.

First, the signal processor 150 acquires the event image Ib (the event signal) from the event detection device 120 (step S301). The signal processor 150 then detects one or a plurality of event areas corresponding to a moving portion on the basis of the event image Ib (the event signal) (step S302). The signal processor 150 then cuts out the portion (the region ROI) corresponding to the detected one or plurality of event areas, out of the event image Ib, thereby acquiring one or a plurality of pieces of image data I$_{ROI}$.

Next, the signal processor 150 generates the framed image Id using the event image Ib (the event signal) outputted from the event detection device 120 in the predetermined time window (step S303). Next, the signal processor 150 detects one or a plurality of parts included in the face on the basis of the framed image Id (step S304). The signal processor 150 then detects the expression on the basis of the event image Ib (the event signal) outputted from the event detection device 120. Specifically, the signal processor 150 detects a motion of one or a plurality of target parts corresponding to the one or plurality of event areas among the one or plurality of parts (the part information 152A) on the basis of the image data I$_{ROI}$ (the event signal) (step S305). Subsequently, the signal processor 150 detects the expression on the basis of the result of the detection (step S306).

Detection of an expression performed by the imaging apparatus 1 may also have a procedure as illustrated in FIG. 17, for example. Specifically, first, the signal processor 150 acquires the captured image Ia (the pixel signal) from the imaging device 140 (step S401). Next, the signal processor 150 generates the framed image Id using the event image Ib (the event signal) outputted from the event detection device 120 in the predetermined time window (step S402). The signal processor 150 then detects one or a plurality of parts included in the face on the basis of the framed image Id (step S403).

The signal processor 150 then detects one or a plurality of event areas corresponding to a moving portion on the basis of the event image Ib (the event signal) (step S404). The signal processor 150 then cuts out the portion (the region ROI) corresponding to the detected one or plurality of event areas, out of the event image Ib, thereby acquiring one or a plurality of pieces of image data I$_{ROI}$.

Next, the signal processor 150 detects the expression on the basis of the event image Ib (the event signal) outputted from the event detection device 120. Specifically, the signal processor 150 detects a motion of one or a plurality of target parts corresponding to the one or plurality of event areas among the one or plurality of parts (the part information 152A) on the basis of the image data I$_{ROI}$ (the event signal) (step S405). Subsequently, the signal processor 150 detects the expression on the basis of the result of the detection (step S406).

Modification Example D

In the modification example C described above, the imaging apparatus 100 may further include the imaging lens 180 and the imaging device 190, for example, as illustrated in FIG. 18. In such a case, the imaging apparatus 100 is able to acquire the captured image Ia including the true smile by executing a procedure illustrated in FIG. 19, for example, which is similar to the procedure in which steps S108 and S109 illustrated in FIG. 9 are added to the steps illustrated in FIG. 16. Further, the imaging apparatus 100 is able to acquire the captured image Ia including the true smile by executing a procedure illustrated in FIG. 20, for example, which is similar to the procedure in which steps S208 and S209 illustrated in FIG. 10 are added to the steps illustrated in FIG. 17.

Modification Example E

In the modification example D described above, the composite device 220 and an imaging lens 210 may be provided instead of the event detection device 120, the imaging device 190, and the imaging lenses 110 and 180. Also in this case, the imaging apparatus 100 is able to acquire the captured image Ia including the true smile.

Moreover, the present disclosure may have the following configurations.

(1)

An imaging apparatus including:

an event detection device that outputs an event signal corresponding to a temporal change of a first pixel signal, the first pixel signal being obtained by imaging; and an expression detector that detects an expression on a basis of the event signal to be outputted from the event detection device.

(2)

The imaging apparatus according to (1), further including:

an imaging device that generates a second pixel signal by imaging;

a motion detector that detects one or a plurality of event areas corresponding to a moving portion on the basis of the event signal; and an object detector that detects one or a plurality of parts included in a face on a basis of the second pixel signal, in which the expression detector detects a motion of one or a plurality of target parts corresponding to the one or plurality of event areas among the one or plurality of parts on the basis of the event signal, and detects an expression on a basis of a result of the detection.

(3)

The imaging apparatus according to (2), in which, in a case where the result indicates that a motion of a mouth is earlier than a motion of an eye, the expression detector determines that the detected expression is a true smile.

(4)

The imaging apparatus according to (1), in which the event detection device further includes an imaging device that outputs a second pixel signal by imaging, the imaging apparatus further includes a motion detector that detects one or a plurality of event areas corresponding to a moving portion on the basis of the event signal, and an object detector that detects one or a plurality of parts included in a face on a basis of the second pixel signal, and the expression detector detects a motion of one or a plurality of target parts corresponding to the one or plurality of event areas among the one or plurality of parts on the basis of the event signal, and detects an expression on a basis of a result of the detection.

(5)

The imaging apparatus according to (4), in which, in a case where the result indicates that a motion of a mouth is earlier than a motion of an eye, the expression detector determines that the detected expression is a true smile.

(6)

The imaging apparatus according to (1), further including:

a frame generator that generates a framed image using the event signal outputted from the event detection device in a predetermined time window;

a motion detector that detects one or a plurality of event areas corresponding to a moving portion on the basis of the event signal; and an object detector that detects one or a plurality of parts included in a face on a basis of the framed image generated by the frame generator, in which the expression detector detects a motion of one or a plurality of target parts corresponding to the one or plurality of event areas among the one or plurality of parts on the basis of the event signal, and detects an expression on a basis of a result of the detection.

(7)

The imaging apparatus according to (6), in which, in a case where the result indicates that a motion of a mouth is earlier than a motion of an eye, the expression detector determines that the detected expression is a true smile.

(8)

A method of detecting an expression, the method including:

generating an event signal corresponding to a temporal change of a first pixel signal, the first pixel signal being obtained by imaging; and detecting an expression on a basis of the event signal that has been generated.

(9)

The method of detecting an expression according to (8), the method further including:

detecting one or a plurality of event areas corresponding to a moving portion on the basis of the event signal;

detecting one or a plurality of parts included in a face on a basis of a second pixel signal generated by imaging; and detecting a motion of one or a plurality of target parts corresponding to the one or plurality of event areas among the one or plurality of parts on the basis of the event signal, and detecting an expression on a basis of a result of the detection.

(10)

The method of detecting an expression according to (9), the method further including, in a case where the result indicates that a motion of a mouth is earlier than a motion of an eye, determining that the detected expression is a true smile.

(11)

The method of detecting an expression according to (8), the method further including:

generating a framed image using the event signal generated in a predetermined time window;

detecting one or a plurality of event areas corresponding to a moving portion on the basis of the event signal;

detecting one or a plurality of parts included in a face on a basis of the framed image that has been generated; and detecting a motion of one or a plurality of target parts corresponding to the one or plurality of event areas among the one or plurality of parts on the basis of the event signal, and detecting an expression on a basis of a result of the detection.

(12)

The method of detecting an expression according to (11), the method further including, in a case where the result indicates that a motion of a mouth is earlier than a motion of an eye, determining that the detected expression is a true smile.

In the imaging apparatus and the method of detecting an expression according to an embodiment of the disclosure, the expression is detected on the basis of the event signal corresponding to the temporal change of the first pixel signal, the first pixel signal being obtained by imaging. This makes it possible to identify a slight difference in the expression. Thus, it is possible to identify the expression. It is to be noted that effects described here are not necessarily limited and any of effects described in the present disclosure may be included.

This application claims the benefit of Japanese Priority Patent Application JP2019-045758 filed with the Japan Patent Office on Mar. 13, 2019, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An imaging apparatus, comprising:
a first pixel array configured to output an event signal corresponding to a temporal change of a first pixel signal, wherein
the first pixel signal is obtained by imaging, and
the temporal change of the first pixel signal indicates a change of a value of the first pixel signal from a first value at a first time instance to a second value at a second time instance; and
a processor configured to detect an expression based on the event signal outputted from the first pixel array.

2. The imaging apparatus according to claim 1, further comprising:
a second pixel array configured to generate a second pixel signal by imaging, wherein the processor is further configured to:
detect, based on the event signal, at least one event area corresponding to a moving portion;
detect, based on the second pixel signal, at least one part included in a face;
detect, based on the event signal, a motion of at least one target part among the at least one part, wherein the at least one target part corresponds to the at least one event area; and
detect the expression based on a result of the detection.

3. The imaging apparatus according to claim 2, wherein the processor is further configured to determine the detected expression as a true smile based on the result indicating that a motion of a mouth is earlier than a motion of an eye.

4. The imaging apparatus according to claim 1, wherein the processor is further configured to determine the detected expression as a true smile based on the result indicating that a motion of a mouth is earlier than a motion of an eye.

5. The imaging apparatus according to claim 1, further comprising a frame generator that generates a framed image using the event signal outputted from the first pixel array in a predetermined time window, wherein
the processor further:
detects one or a plurality of event areas corresponding to a moving portion on the basis of the event signal;
detects one or a plurality of parts included in a face on a basis of the framed image generated by the frame generator;
detects a motion of one or a plurality of target parts corresponding to the one or plurality of event areas among the one or plurality of parts on the basis of the event signal; and
detects the expression on a basis of a result of the detection of the motion.

6. The imaging apparatus according to claim 5, wherein, in a case where the result indicates that a motion of a mouth is earlier than a motion of an eye, the processor further determines that the detected expression is a true smile.

7. A method of detecting an expression, the method comprising:
in an imaging apparatus:
generating an event signal corresponding to a temporal change of a first pixel signal, wherein
the first pixel signal is obtained by imaging, and
the temporal change of the first pixel signal indicates a change of a value of the first pixel signal from a first value at a first time instance to a second value at a second time instance; and
detecting the expression based on the generated event signal.

8. The method of detecting the expression according to claim 7, the method further comprising:
detecting at least one event area corresponding to a moving portion, based on the event signal;
detecting at least one part included in a face based on a second pixel signal generated by imaging;
detecting the motion of at least one target part among the at least one part, based on the event signal, wherein the at least one target part corresponds to the at least one event area; and
detecting an expression based on a result of the detection.

9. The method of detecting the expression according to claim 8, the method further comprising determining the detected expression as a true smile based on the result indicating that a motion of a mouth is earlier than a motion of an eye.

10. The method of detecting an expression according to claim 7, the method further comprising:
generating a framed image using the event signal generated in a predetermined time window;
detecting one or a plurality of event areas corresponding to a moving portion on the basis of the event signal;
detecting one or a plurality of parts included in a face on a basis of the framed image that has been generated; and
detecting a motion of one or a plurality of target parts corresponding to the one or plurality of event areas among the one or plurality of parts on the basis of the event signal, and detecting the expression on a basis of a result of the detection.

11. The method of detecting the expression according to claim 10, the method further comprising, in a case where the result indicates that a motion of a mouth is earlier than a motion of an eye, determining that the detected expression is a true smile.

* * * * *